United States Patent
Shinkawa

(10) Patent No.: US 7,523,339 B2
(45) Date of Patent: Apr. 21, 2009

(54) INFORMATION PROCESSING APPARATUS AND MEDIA STORAGE APPARATUS USING THE SAME

(75) Inventor: Takayuki Shinkawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 10/980,429

(22) Filed: Nov. 3, 2004

(65) Prior Publication Data

US 2005/0262374 A1 Nov. 24, 2005

(30) Foreign Application Priority Data

May 20, 2004 (JP) ............................. 2004-150582

(51) Int. Cl.
*G06F 1/32* (2006.01)
(52) U.S. Cl. .................. 713/600; 713/320; 713/322
(58) Field of Classification Search ............... 713/1–601
See application file for complete search history.

(56) References Cited

U.S. PATENT DOCUMENTS

| 5,878,251 | A | * | 3/1999 | Hagiwara et al. | ........... 713/601 |
| 6,138,232 | A | * | 10/2000 | Shiell et al. | .................. 712/244 |
| 6,341,355 | B1 | * | 1/2002 | Rutherford et al. | .......... 713/501 |
| 6,587,954 | B1 | * | 7/2003 | Chiu | .......................... 713/400 |
| 2003/0006807 | A1 | * | 1/2003 | Masuda et al. | ................. 327/99 |

FOREIGN PATENT DOCUMENTS

JP 8-87818 4/1996

* cited by examiner

*Primary Examiner*—Thomas Lee
*Assistant Examiner*—Paul B Yanchus, III
(74) *Attorney, Agent, or Firm*—Greer, Burns & Crain, Ltd.

(57) ABSTRACT

An information processing apparatus switches a clock to reduce power consumption of an information processing unit. In order to reduce an overhead time in switching, the information processing apparatus includes an interrupt controller for generating a clock switch signal by accepting an interrupt to each information processing unit and a clock switch circuit for switching the clock to be supplied to the information processing unit. Using a hardware interrupt signal to switch the clock to be supplied to circuits, the circuit clock can be switched real time, and reduction of the power consumption can be achieved.

10 Claims, 4 Drawing Sheets

INFORMATION PROCESSING APPARATUS AND MEDIA STORAGE APPARATUS USING THE SAME

CROSS-REFERENCE TO RELATED APPLICATIONS

This application is based upon and claims the benefit of priority from the prior Japanese Patent Application No. 2004-150582, filed on May 20, 2004, the entire contents of which are incorporated herein by reference.

BACKGROUND OF THE INVENTION

1. Field of the Invention

The present invention relates to information processing apparatus which switches an operation clock depending on necessity to reduce power consumption, and a media storage apparatus using the same.

2. Description of the Related Art

With the development of data processing technology in recent years, use of peripheral apparatuses, such as magnetic disk apparatuses, each having a processor that is operated by a firmware program, has increased. In a so-called information processing apparatus operated by such a processor, each individual circuit operates in synchronization by receiving a clock.

As high-speed information processing apparatuses have been required in recent years, in particular, processors, operating at high speeds using fast clocks are coming into use, as well as peripheral circuits connected to the processors. Such a fast clock is accompanied with an increase of power consumption and heat quantity. Meanwhile, when the information processing apparatus is operated with an external power supply, such as a battery, etc., reduction of power consumption is required in the information processing apparatus.

As a method for realizing both high speed and low power consumption in the information processing apparatus, it is effective to employ such a method that, when there is no request for processing during operation of the information processing apparatus, the clock supply is either switched to a low-speed clock, or suspended; and when the request for processing arises, the clock is restored to a high-speed clock, or the clock supply is restarted.

Conventionally, the above-mentioned clock switch operation has been performed in such a way that, when the processor supplied with the low-speed clock receives an interrupt request, the request is recognized by firmware processing (interrupt processing), and a clock mode register is set to a high-speed mode. Thus, a clock gate is switched, and thereby high-speed clock is supplied, as an example, in the Japanese Laid-open Patent Publication No. Hei-8-087818.

According to the conventional method of switching the clock by the firmware, clock switching can be performed as a part of firmware interrupt processing, and accordingly, no extra hardware is needed. On the other hand, a problem of an overhead time arises when switching the clock.

Namely, upon receipt of the interrupt request, the processor interprets the request by firmware, performs clock switching processing as a part of the interrupt processing, sets the clock mode in the register, and finally switches the clock. Thus, considerable time is needed to complete the switching.

Therefore, the switching processed by firmware requires a certain time period. Furthermore, since the above operation is performed while the processor is running with a low-speed clock, the processing itself is performed at low speed, and it takes time to handle the interrupt request before the inherent interrupt processing is performed with a high-speed clock. As a result, time responsibility against the interrupt request becomes degraded, caused by the clock switching performed in a low power consumption state. This impedes the merit of switching over to the high-speed clock.

SUMMARY OF THE INVENTION

Accordingly, it is an object of the present invention to provide an information processing apparatus for reducing the overhead of switching time even when the clock is switched to obtain reduced power consumption, and a media storage apparatus using the information processing apparatus.

It is another object of the present invention to provide an information processing apparatus for improving time responsibility against an interrupt request even when the clock is switched to reduce power consumption, and a media storage apparatus using the information processing apparatus.

It is still another object of the present invention to provide an information processing apparatus for improving time responsibility of the apparatus by switching to a clock suitable to individual circuits, even when the clock is switched to reduce the power consumption, and a media storage apparatus using the information processing apparatus.

In order to achieve the aforementioned objects, according to the present invention, an information processing apparatus which performs information processing by receiving a clock is disclosed. The information processing apparatus includes: an information processing apparatus which performs interrupt processing on receipt of an interrupt; an interrupt control circuit which generates a clock switch signal on receipt of the interrupt; and a clock switch circuit which switches a clock frequency to be supplied to the information processing apparatus according to the clock switch signal.

Further, according to the present invention, a media storage apparatus for at least reading data stored in a media storage is also disclosed. The media storage apparatus includes a media storage unit for at least reading the data stored in the media storage, and a controller for controlling the media storage unit according to an external instruction. The controller further includes: an information processing unit which performs interrupt processing on receipt of an interrupt; an interrupt control circuit which generates a clock switch signal on receipt of the interrupt; and a clock switch circuit which switches a clock frequency to be supplied to the information processing unit according to the clock switch signal.

Still further, according to the present invention, preferably the clock switch circuit further includes: a first circuit which generates a relatively fast clock; a second circuit which generates a relatively slow clock; and a switch circuit which switches from the slow clock to the fast clock according to the clock switch signal.

Further, according to the present invention, preferably the clock switch circuit further includes a circuit which generates the clock, and a switch circuit which permits outputting the clock, according to the clock switch signal.

Still further, according to the present invention, preferably the information processing unit clears the clock switch signal of the interrupt control circuit, on completion of the interrupt processing.

Further, according to the present invention, preferably the interrupt control circuit receives a plurality of interrupts, and selectively generates the clock switch signal according to each kind of the plurality of interrupt factors.

Further, according to the present invention, preferably the interrupt control circuit further includes a first interrupt status register for accepting a plurality of interrupts, and a second interrupt status register for clock switching for generating the clock switch signal from the first interrupt status register. According to the acceptance of the interrupt, the information processing unit clears the accepted interrupt in the first interrupt status register on acceptance of the interrupt, and clears the second interrupt status register for clock switching, on completion of the interrupt processing.

Further, according to the present invention, preferably the interrupt control circuit further includes a selector disposed between the first interrupt status register and the second interrupt status register for clock switching, for selecting an interrupt to be set from the first interrupt status register to the second interrupt status register, according to the plurality of interrupt factors.

Further, according to the present invention, preferably the clock switch circuit further includes a plurality of clock switch circuits each corresponding to each circuit constituting the information processing unit.

Still further, according to the present invention, preferably the clock generation circuit in the clock switch circuit includes a programmable clock divider of which division ratio is programmable.

Further features of the present invention will become more apparent from the following description of the embodiments and the accompanied drawings.

DETAILED DESCRIPTION OF THE INVENTION

The preferred embodiment of the present invention is described hereinafter, on the order of information processing apparatus, clock switching method, and other embodiments, by referring to the charts and drawings. However, it is noted that the scope of the present invention is not limited to the embodiments described below.

Information Processing Apparatus

Figure 1:
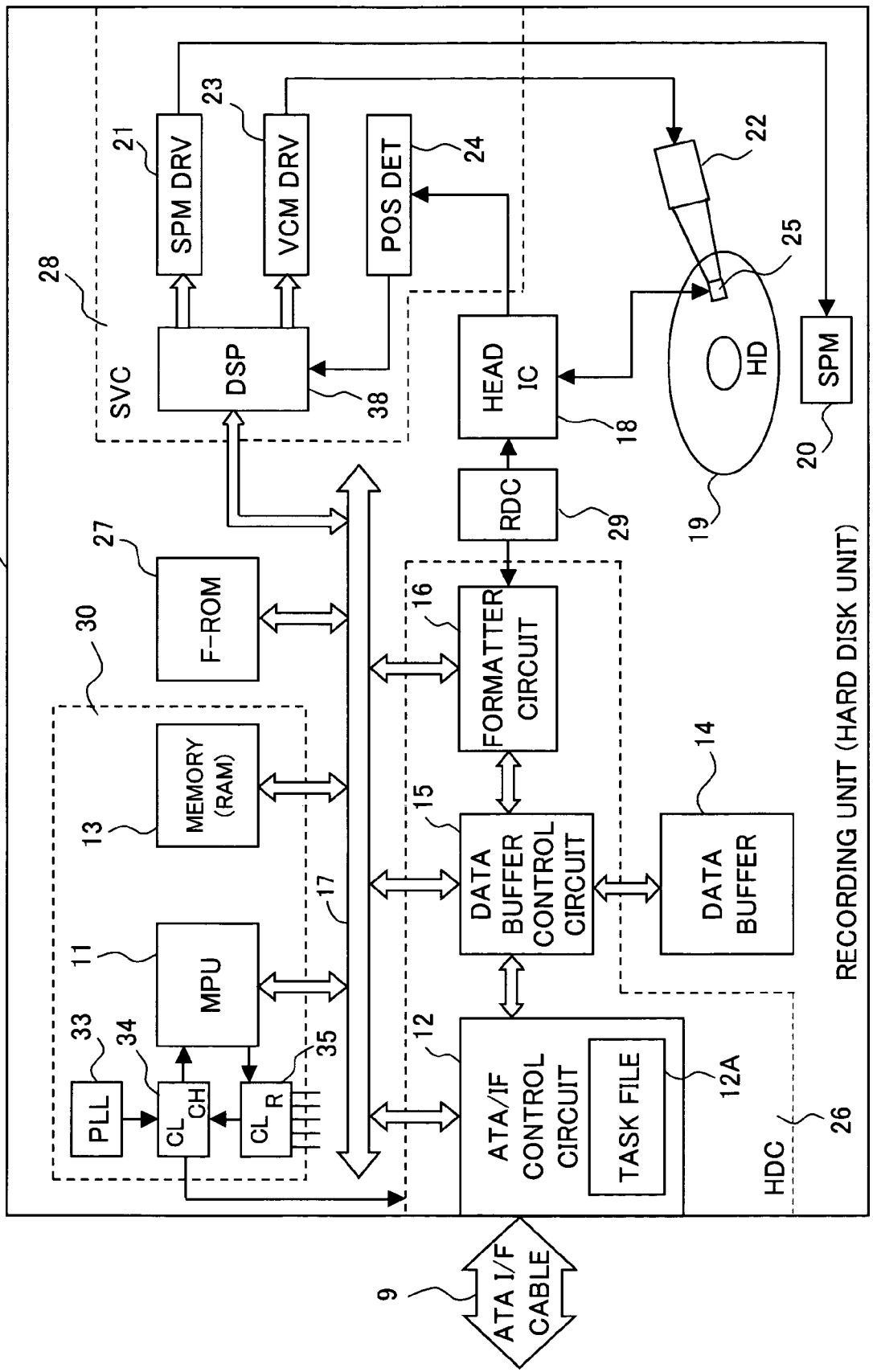
FIG. 1 shows a configuration diagram of an information processing apparatus according to one embodiment of the present invention.
Figure 2:
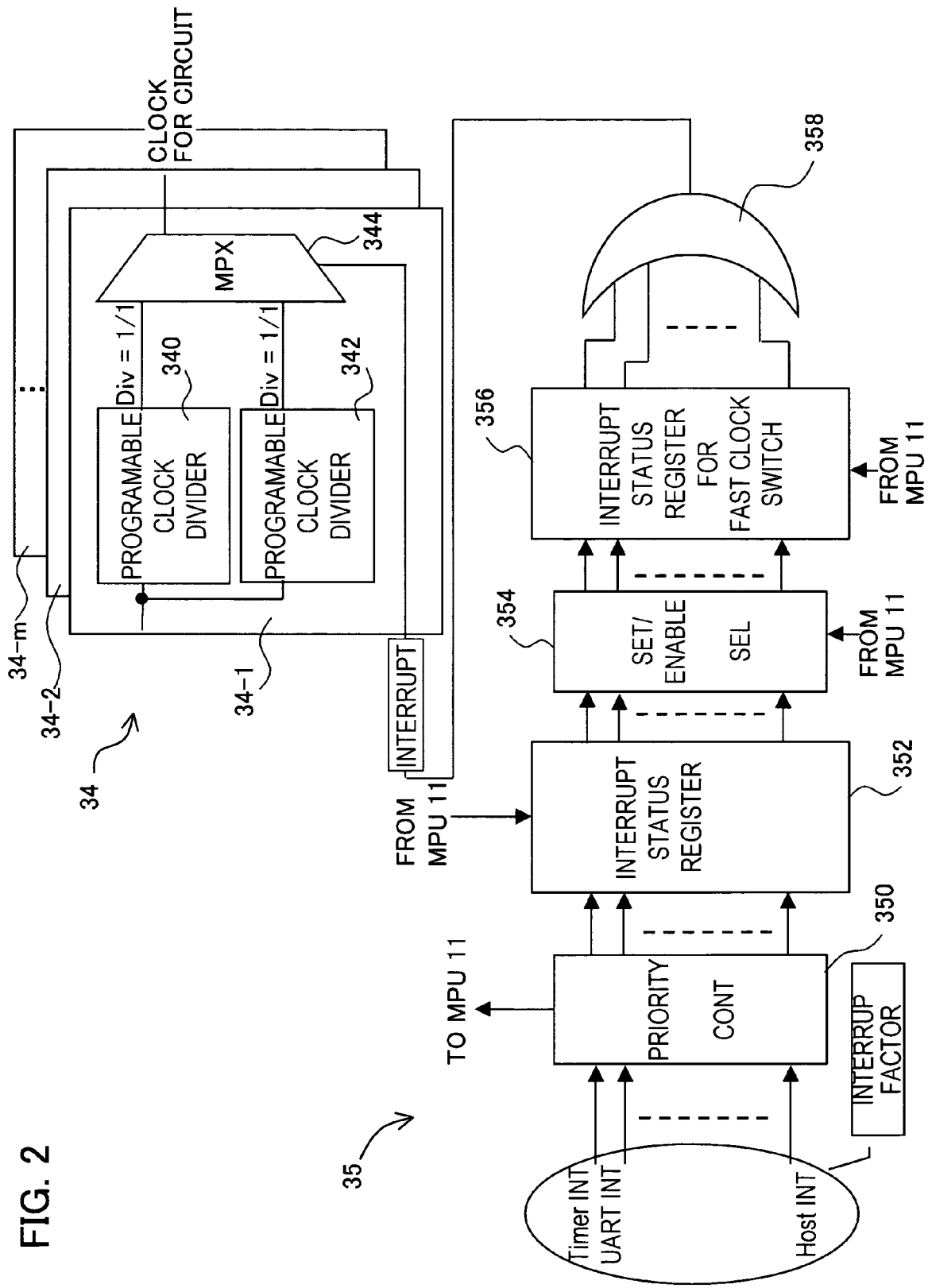
FIG. 2 shows a diagram illustrating a clock switch circuit shown in FIG. 1.

FIG. 1 shows a configuration diagram of a media storage apparatus using an information processing apparatus according to one embodiment of the present invention. FIG. 2 shows a diagram illustrating a clock switch circuit shown in FIG. 1.

In FIG. 1, as an example of the information processing apparatus, a controller of a magnetic disk apparatus (HDD) which reads/writes data from/to a magnetic disk, which is a media storage apparatus, is shown. As shown in FIG. 1, a magnetic disk apparatus 10 is connected to a host (not shown) such as a personal computer by a cable 9 having an interface conforming to the ATA (AT Attachment) standard.

As shown in FIG. 1, the magnetic disk apparatus 10 includes a magnetic disk 19, a spindle motor 20 for rotating the magnetic disk 19, a magnetic head 25 for reading/writing data from/to the magnetic disk 19, and an actuator (VCM) 22 for moving the magnetic head 25 in the radius (cross-track) direction of the magnetic disk 19.

Further, as the controller, a HDC (hard disk controller) 26, a data buffer 14, a MPU 11, a memory (RAM) 13, and a nonvolatile memory (F-ROM) 27 are provided. Also, as a drive controller, a read channel circuit 29, a head IC 18, and a servo controller 28 are provided.

The servo controller 28 is provided with a spindle motor driver 21, a VCM driver 23, a position detector 24, and a DSP 38. Here, HDC 26, MPU 11, RAM 13, F-ROM 27 and the servo controller 28 are connected by a bus 17.

HDC 26 includes an ATA interface controller 12 having a task file 12A to which the host sets a task, a data buffer controller 15 for controlling the data buffer 14, and a formatter controller 16 for controlling the recording data format.

The read channel circuit 29 selects a magnetic head for reading or writing data according to an instruction from HDC 26. When reading, the read channel circuit 29 receives read data from the magnetic head, and when writing, the circuit supplies write data to the magnetic head. The head IC 18 makes recording current flow to the magnetic head 25 according to the recording data, and outputs read data (including servo information) after amplifying a read signal output from the magnetic head 25.

The position detector 24 detects a position of the magnetic head 25 from the servo information fed from the head IC 18. The spindle driver 21 drives the spindle motor 20 to rotate. The VCM driver 23 drives the VCM (voice coil motor) 22 to move the magnetic head 25. DSP (digital signal processor) 38 performs position control of VCM 22 via VCM driver 23, so as to control the position of the magnetic head 25 to a target position, using a present position received from the position detector 24 and the target position received from MPU (microprocessor) 11.

MPU 11 performs position control, read/write control, and retry control of the magnetic head 25. Memory (RAM) 13 stores data necessary for the processing of MPU 11. Nonvolatile memory 27 stores processing program of MPU 11 and firmware.

MPU 11 and RAM 13 are housed in an MPU block 30. As shown in FIG. 2 in detail, this MPU block 30 includes a PLL (phase lock loop) circuit 33 for generating a reference clock; an interrupt controller 35 for generating an interrupt from an interrupt signal fed from a plurality of interrupt signal lines; and a clock switch circuit 34 for switching the clock to be supplied to MPU 11 and peripheral circuits in HDC 26, etc. caused by an interrupt from the interrupt controller 35.

As shown in FIG. 2, the clock switch circuit 34 is constituted of a plurality of clock switch circuits 34-1 to 34-m each corresponding to each operation frequency of individual circuits (for example, MPU 11, and the interface circuit 12 and the buffer controller 15 in HDC 26).

Each clock switch circuit 34-1 to 34-m includes a pair of programmable clock dividers 340, 342 for dividing the reference clock (PLL output) of the PLL circuit 33 at a programmed division ratio, and a multiplexer 344. The programmable clock divider 340 outputs a high-speed clock (which is referred to as fast clock), with the division ratio being set, for example, to 1:1. In contrast, the program clock divider 342 outputs a low-speed clock (which is referred to as slow clock), with the division ratio being set, for example, to 1:n.

In this example, the clock switch circuit 34-1 can output either the fast clock, or the slow clock having a frequency of 1/n of the fast clock. The multiplexer 344 outputs the slow clock in normal cases, and it outputs the fast clock when the interrupt signal is set to the high level.

Meanwhile, the interrupt controller 35 includes a priority controller 350 for controlling the priority of a plurality of interrupt factors (signals); a first interrupt status register 352 for storing each state of the interrupt factors; a set-enable selector 354; a second interrupt status register (for switching to the fast clock) 356; and an OR circuit 358 for outputting an interrupt signal (clock switch signal) for the fast clock to the clock switch circuit 34, by ORing each register of the interrupt status register (for switching to the fast clock) 356.

Interrupt factors to MPU 11 includes a timer interrupt, a serial transfer interrupt (UART), and a host interrupt. When a plurality of interrupt requests are received simultaneously, the priority controller 350 gives priority to one interrupt request according to a predetermined priority order, and sets an interrupt state to a corresponding register of the status register 352.

Also, the interrupt to which the priority is given is notified to MPU 11. This interrupt status register 352 is cleared when the interrupt processing is completed in MPU 11. MPU 11 sets set-enable selector 354 in advance so that a type of interrupt to be switched to the fast clock is set to 'enable'. Among interrupt factors set in the interrupt status register 352, an interrupt enabled by the set-enable selector 354 is set to the interrupt status register (for switching to the fast clock) 356.

This interrupt status register (for switching to the fast clock) 356 is cleared by MPU 11, on completion of the interrupt processing. The register contents for each interrupt factor in the interrupt status register (for switching to the fast clock) 356 are ORed in the OR circuit 358, and the OR result outputs to the clock switch circuit 34.

Namely, when any interrupt signal is being input, the multiplexer 344 in the clock switch circuit 34 selects a clock having the division ratio of 1/1. In contrast, when no interrupt signal is being input, the multiplexer 344 selects a clock having the division ratio of 1/n. The selected clock is supplied as circuit clock. In this circuit, circuit clock supply can be selected.

For example, in case of FIG. 1, as to the fast clock frequencies, 133 MHz for MPU 11, 100 MHz for ATA interface circuit 12A, and 66 MHz for data buffer 14 are applied, respectively.

Clock Switching Method

Figure 3:
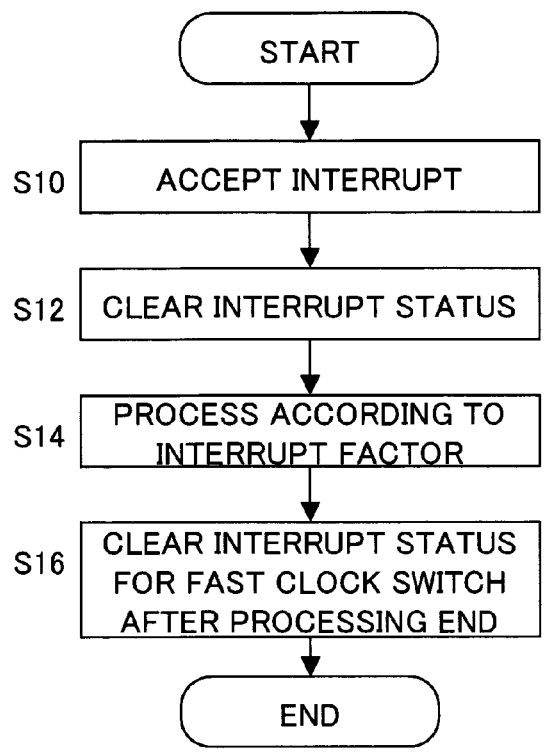
FIG. 3 shows a processing flowchart of the interrupt processing shown in FIG. 1.
Figure 4:
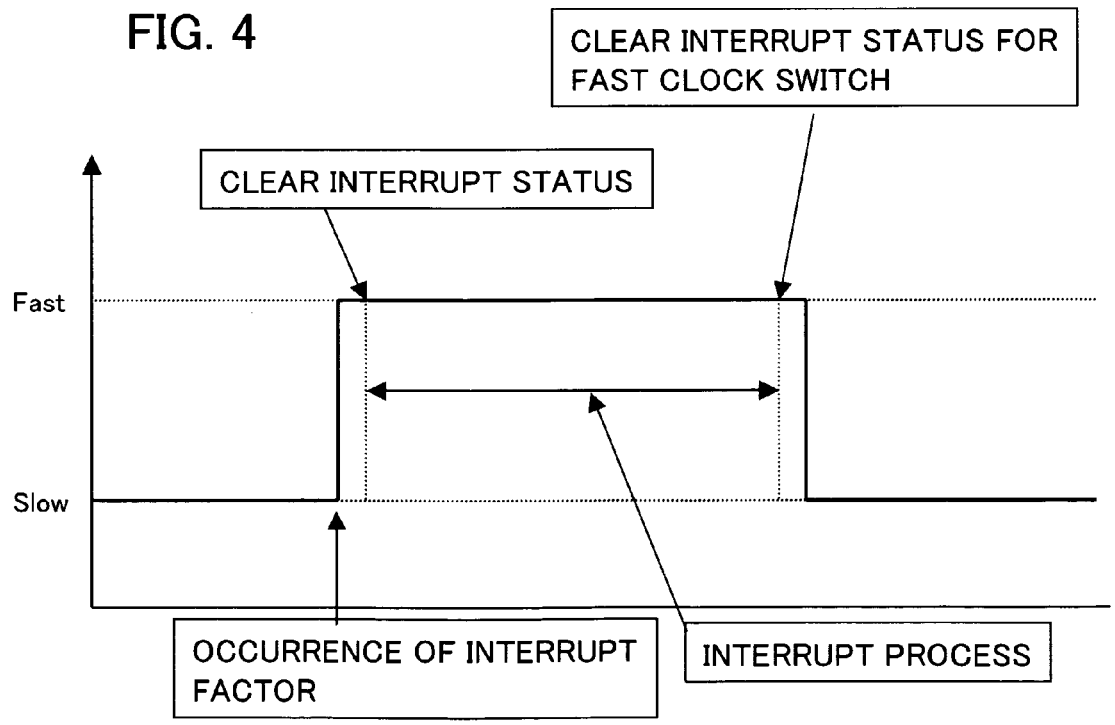
FIG. 4 shows an explanation diagram of the interrupt processing shown in FIG. 3.

FIG. 3 shows a processing flowchart of the interrupt processing in MPU 11, illustrating a clock switching method according to one embodiment of the present invention. FIG. 4 shows an explanation diagram of the operation according to the above clock switching method. Hereafter, referring to FIG. 4, the processing shown in FIG. 3 will be described.

(S10) As shown in FIG. 4, in a state that no interrupt signal is input, the multiplexer 344 in the clock switch circuit 34 selects the slow clock of the programmable clock divider 342. As shown in FIG. 4, on the occurrence of an interrupt factor, the priority controller 350 gives the priority to one interrupt according to the predetermined priority order, as described earlier, and sets an interrupt state into a corresponding register of the interrupt status register 352.

The interrupt to which the priority has been given is accepted in MPU 11. In the set-enable selector 354, the interrupt 'enabled' by the set-enable selector 354 is set to the interrupt status register (for switching to the fast clock) 356.

The contents of each register for each interrupt in the interrupt status register (for switching to the fast clock) 356 are ORed in the OR circuit 358, and OR result outputs to the multiplexer 344 in the clock switch circuit 34. The multiplexer 344 selects the fast clock in the programmable clock divider 340. Thus, as shown in FIG. 4, MPU 11, HDC 26, etc. operate with the fast clock.

(S12) When MPU 11 accepts the interrupt, MPU 11 clears the interrupt status in the interrupt status register 352 of the interrupt controller 35. At this time, the interrupt status register (for switching to the fast clock) 356 is not cleared. Accordingly, the multiplexer 344 continues selecting the fast clock of the programmable clock divider 340.

(S14) MPU 11 then executes interrupt processing corresponding to the above interrupt content.

(S16) When MPU 11 completes the interrupt processing corresponding to the interrupt factor, MPU 11 clears the interrupt status in the interrupt status register (for switching to the fast clock) 356. With this, the multiplexer 344 is returned from the fast clock selection state by the programmable clock divider 340 to the slow clock selection state by the programmable clock divider 342. Thus, as shown in FIG. 4, the slow clock is supplied to MPU 11, HDC 26, etc.

As such, the conventional method of switching the clock by firmware is replaced by a method of switching the circuit clock using a hardware interrupt signal, according to the present invention. Thus, the circuit clock is switched in real time, enabling reduced power consumption. Further, since firmware processing using the slow clock is not required to switch the clock, the response speed against interrupt in the information processing apparatus (MPU, HDC, etc.) can be improved.

Moreover, by using the set-enable selector 354, it becomes possible to specify an interrupt factor which is not required to set to the interrupt status register (for switching to the fast clock) 356, according to the interrupt factor. Accordingly, on the occurrence of an interrupt cause which does not require fast processing, use of the slow clock may be continued. Namely, on the occurrence of an interrupt, different circuit clock can be set according to the interrupt factor.

In particular, in the case of peripheral apparatus such as a magnetic disk apparatus and a printer, because such apparatus has mechanical portions, quantity of power consumed is relatively large, and in some cases, the power is supplied externally. Therefore, the effect of lower power consumption becomes large even when an improved time of clock switch time is relatively small.

Other Embodiments

Figure 5:
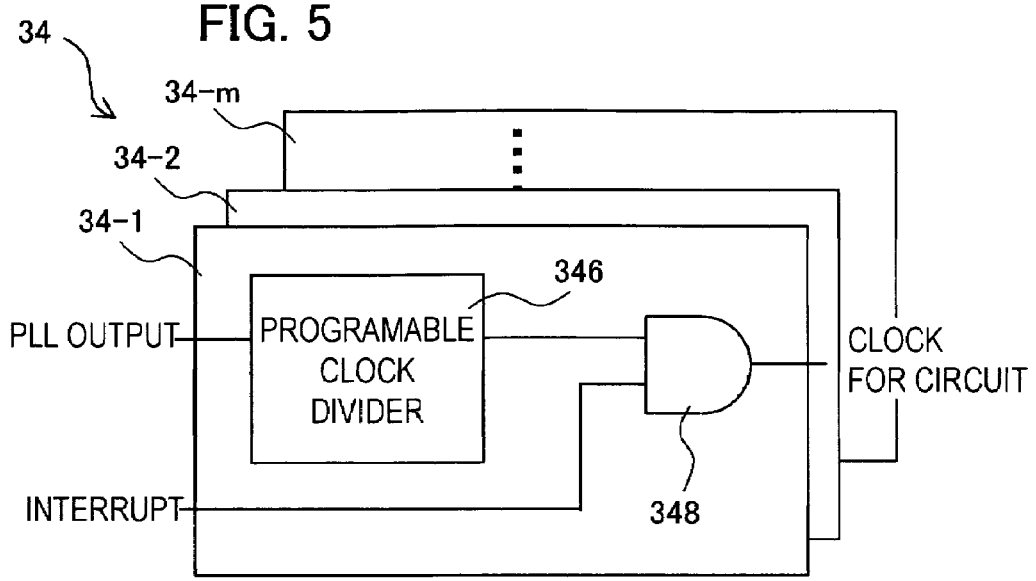
FIG. 5 shows a configuration diagram of a clock switch circuit according to another embodiment of the present invention.

FIG. 5 shows a configuration diagram of a clock switch circuit according to another embodiment of the present invention. In FIG. 5, only clock switch circuit 34 is illustrated, while the interrupt controller 35 is identical to the interrupt controller shown in FIG. 2.

As shown in FIG. 5, the clock switch circuit 34 includes a plurality of clock switch circuits 34-1 to 34-m, corresponding to the operation frequency of each circuit (for example, MPU 11, and interface circuit 12 and buffer controller in HDC 26).

Each clock switch circuit 34-1 to 34-m includes a single programmable clock divider 346 for dividing the reference clock (PLL output) of PLL circuit 33 at a programmed division ratio, and a gate 348. The programmable clock divider 346 is provided for outputting a high-speed clock (fast clock), with the division ratio being set, for example, to 1:1.

In this example, the clock switch circuit 34-1 can either output or suspend the fast clock, which is controllable by the gate 348 corresponding to an interrupt signal. Namely, the clock switch circuit 34-1 outputs the fast clock while the interrupt signal is being set to the high level.

In the above another embodiment also, the circuit clock is suspended using a hardware interrupt signal. Thus, the circuit clock is switched in real time, enabling reduced power consumption more than ever.

Moreover, conventionally, the clock switching is performed using firmware, and therefore the MPU clock has to be input at any time. However, inherently, in a case where no circuit operation is required, namely in the state of no occurrence of interrupt, inputting the circuit clock is not necessary. Therefore, by completely suspending the clock, further reduction of power consumption can be achieved.

Figure 6:
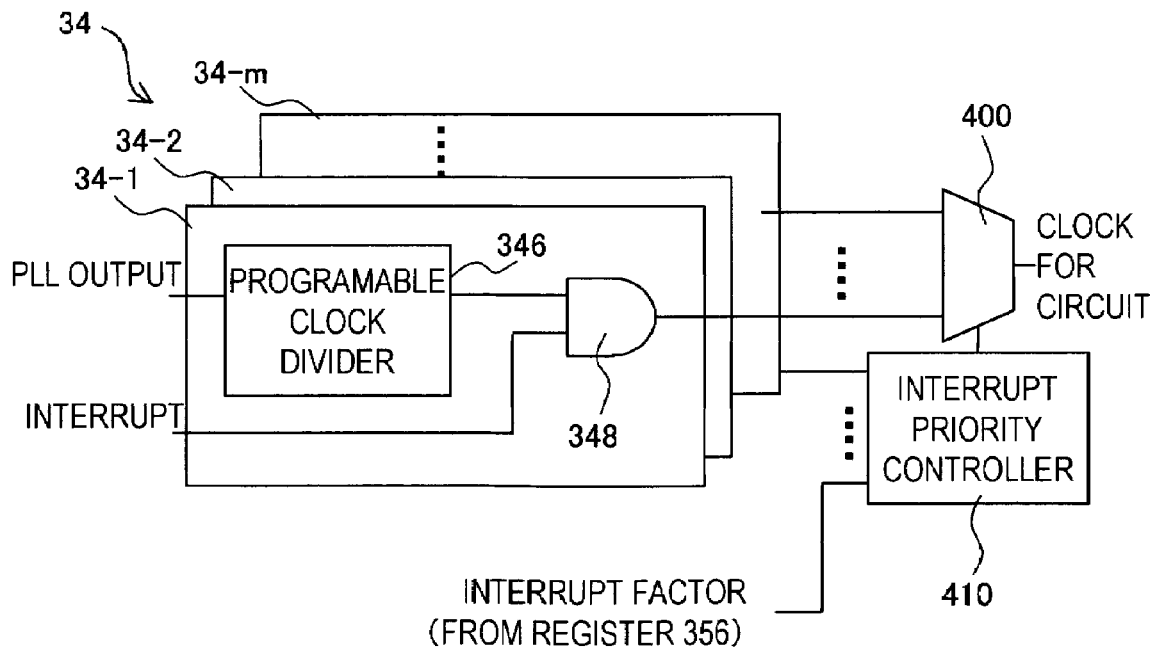
FIG. 6 shows a configuration diagram of a clock switch circuit according to still another embodiment of the present invention.

FIG. 6 shows still another embodiment of the present invention, in which the configuration diagram of a clock switch circuit according to this embodiment is illustrated. In FIG. 6, the like parts shown in FIG. 5 are shown by like symbols. Only clock switch circuit 34 is illustrated here, since the configuration of the interrupt controller 35 is identical to that shown in FIG. 2.

As shown in FIG. 6, the clock switch circuit 34 includes a plurality of clock switch circuits 34-1 to 34-m, corresponding to the operation frequency of each circuit (for example, MPU 11, and interface circuit 12 and the buffer controller 15 in the HDC 26) for each interrupt factor.

Similarly to FIG. 5, each clock switch circuit 34-1 to 34-m includes a single programmable clock divider 346 for dividing the reference clock (PLL output) of the PLL circuit 33 at a programmed division ratio, and a gate 348. The programmable clock divider 346 outputs fast clocks of different frequencies from each clock switch circuit 34.

In this example also, the gate 348 controls an output or suspend of fast clock of the clock switch circuits 34-1 to 34-m according to interrupt signal. Namely, each clock switch circuit 34-1 to 34-m outputs the fast clock while the interrupt signal is being set to the high level.

Furthermore, an interrupt priority controller 410 and a multiplexer 400 are provided for the interrupt control, by which the circuit clock frequency to be supplied to each circuit is switched according to each interrupt factor.

Namely, the interrupt priority controller 410 determines the interrupt factor from the content of interrupt status register (for switching to the fast clock) 356 shown in FIG. 2, and selects the multiplexer 400. The multiplexer 400 switches each output of clock switch circuit 34-1 to 34-m using the selection signal fed from the interrupt priority controller 410, and supplies the clock to each circuit.

Each clock switch circuit 34-1 to 34-m outputs the clock of a different frequency. Thus, in response to a plurality of multiple interrupts, it becomes possible to supply the clock of a different frequency according to the interrupt factor, so that the frequency is suitable for each circuit (such as MPU 11) in view of balancing between processing speed and low power consumption.

Namely, by providing the interrupt priority controller 410, the circuit clock can be selected to the maximum or the minimum value, or any other. Also, the embodiment produces the similar effect to the embodiment shown in FIG. 5.

In the configuration shown in FIG. 6, the interrupt priority controller 410 directly receives the interrupt factors shown in FIG. 2. When a multiple interrupt occurs, the circuit clock of the maximum value is selected, so that a plurality of interrupts are processed successively. On the other hand, when no multiple interrupt occurs, for example in case of a single interrupt, the circuit clock of minimum value may be selected.

In the above-mentioned other embodiment, the information processing apparatus is exemplified by a magnetic disk controller. However, it may be applicable to other storage apparatus such as the apparatus using an optical disk, an optical magnetic disk, and other storage apparatus using other storage media. Also, the method according to the present invention may be applicable not only to the disk apparatus, but also to a peripheral apparatus including other memory apparatus, printers, image processing apparatus, etc. which are operated by the OS in the upper-level apparatus, as well as personal computers, portable terminal apparatus including portable telephones, information home appliances, etc.

Additionally, the interface is not limited to the ATA interface, and may be applicable to other interfaces. Also, the present invention is also applicable to a case of a single interrupt factor, though a plurality of interrupt factors have been illustrated in the foregoing description. Moreover, the interrupt factors may not be limited to the embodiments shown above, and other kinds of interrupt factors are applicable.

According to the present invention, the conventional method of switching the clock by firmware is replaced by a method of switching the circuit clock using a hardware interrupt signal, enabling switching of the circuit clock in real time with reduced power consumption. Further, since firmware processing using a slow clock is not required, it is possible to obtain an improved response speed against the interrupts in information processing apparatus (MPU, HDC, etc.), which becomes of use to provide an apparatus satisfying both low power consumption and high-speed time responsibility.

The foregoing description of the embodiments is not intended to limit the invention to the particular details of the examples illustrated. Any suitable modifications and equivalents may be resorted to the scope of the invention. All features and advantages of the invention which fall within the scope of the invention are covered by the appended claims.

What is claimed is:

1. An information processing apparatus for performing information processing by receiving a clock, comprising:
   an information processing unit which performs interrupt processing on receipt of an interrupt;
   an interrupt control circuit which asserts a clock switch signal on receipt of the interrupt; and
   a clock switch circuit which switches a clock frequency to be supplied to the information processing unit according to the clock switch signal;
   wherein the interrupt control circuit further comprises:
   a first interrupt register for storing a selected interrupt;
   a priority control circuit for selecting one interrupt between a plurality of received interrupts according to a priority order, setting the selected interrupt to the first interrupt register and transmitting the selected interrupt to the information processing unit; and
   a second interrupt status register for setting the content of the first interrupt status register which is judged an enable by the information processing unit and generating the clock switch signal according to each kind of the plurality of interrupts from the setting content,
   and wherein the information processing unit clears the accepted interrupt in the first interrupt status register when the information processing unit accepts the selected interrupt, and clears the second interrupt status register, on completion of the interrupt processing.

2. The information processing apparatus according to claim 1, wherein the clock switch circuit further comprises:
   a first circuit which generates a relatively fast clock;
   a second circuit which generates a relatively slow clock; and
   a switch circuit which switches from the slow clock to the fast clock according to the clock switch signal.

3. The information processing apparatus according to claim 1, wherein the clock switch circuit further comprises:
  a circuit which generates the clock; and
  a switch circuit which permits outputting the clock of the circuit, according to the clock switch signal.

4. The information processing apparatus according to claim 1, wherein the clock switch circuit further comprises a plurality of clock switch circuits each corresponding to each circuit constituting the information processing unit.

5. The information processing apparatus according to claim 1, wherein a clock generation circuit in the clock switch circuit comprises a programmable clock divider of which division ratio is programmable.

6. A media storage apparatus for performing information processing by receiving a clock, comprising:
  an information processing unit which performs interrupt processing on receipt of an interrupt;
  an interrupt control circuit which asserts a clock switch signal on receipt of the interrupt; and
  a clock switch circuit which switches a clock frequency to be supplied to the information processing unit according to the clock switch signal;
  wherein the interrupt control circuit further comprises:
  a first interrupt register for storing a selected interrupt;
  a priority control circuit for selecting one interrupt between a plurality of received interrupts according to a priority order, setting the selected interrupt to the first interrupt register and transmitting the selected interrupt to the information processing unit; and
  a second interrupt status register for setting the content of the first interrupt status register which is judged an enable by the information processing unit and generating the clock switch signal according to each kind of the plurality of interrupts from the setting content,
  and wherein the information processing unit clears the accepted interrupt in the first interrupt status register when the information processing unit accepts the selected interrupt, and clears the second interrupt status register, on completion of the interrupt processing.

7. The media storage apparatus according to claim 6, wherein the clock switch circuit further comprises a plurality of clock switch circuits each corresponding to each circuit constituting the information processing unit.

8. The media storage apparatus according to claim 6, wherein a clock generation circuit in the clock switch circuit comprises a programmable clock divider of which division ratio is programmable.

9. The media storage apparatus according to claim 6, wherein the clock switch circuit further comprises:
  a first circuit which generates a relatively fast clock;
  a second circuit which generates a relatively slow clock; and
  a switch circuit which switches from the slow clock to the fast clock according to the clock switch signal.

10. The media storage apparatus according to claim 6, wherein the clock switch circuit further comprises:
  a circuit which generates the clock; and
  a switch circuit which permits outputting the clock of the circuit, according to the clock switch signal.

* * * * *